(12) United States Patent
Deixler et al.

(10) Patent No.: US 12,550,243 B2
(45) Date of Patent: Feb. 10, 2026

(54) INVOLVING THE USER IN CONTEXT-SENSING INFERENCE IN A LIGHTING ARRANGEMENT

(71) Applicant: SIGNIFY HOLDING B.V., Eindhoven (NL)

(72) Inventors: Peter Deixler, Arlington, MA (US); Massimo Tumolo, Utrecht (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 18 days.

(21) Appl. No.: 18/030,798

(22) PCT Filed: Oct. 4, 2021

(86) PCT No.: PCT/EP2021/077260
§ 371 (c)(1),
(2) Date: Apr. 7, 2023

(87) PCT Pub. No.: WO2022/073912
PCT Pub. Date: Apr. 14, 2022

(65) Prior Publication Data
US 2023/0371154 A1  Nov. 16, 2023

Related U.S. Application Data

(60) Provisional application No. 63/088,568, filed on Oct. 7, 2020.

(30) Foreign Application Priority Data

Oct. 30, 2020 (EP) .................... 20204815

(51) Int. Cl.
*H05B 47/10* (2020.01)
*H05B 47/115* (2020.01)
(Continued)

(52) U.S. Cl.
CPC ....... *H05B 47/115* (2020.01); *H05B 47/1975* (2024.01); *H05B 47/19* (2020.01)

(58) Field of Classification Search
CPC ...... H05B 47/10; H05B 47/115; H05B 47/19; H05B 45/10; H05B 45/14; H05B 45/30
See application file for complete search history.

(56) References Cited

U.S. PATENT DOCUMENTS

2004/0105264 A1* 6/2004 Spero .................. H05B 47/172
362/276
2010/0026479 A1 2/2010 Tran
(Continued)

FOREIGN PATENT DOCUMENTS

WO  2010079388 A1  7/2010
WO  2020037399 A1  2/2020

OTHER PUBLICATIONS

Santhalingam, Panneer Selvam, et al., "MMASL: Environment-Independent ASL Gesture Recognition Using 60 Ghz Millimeter-Wave Signals," Proc. ACM Interact. Mob. Wearable Ubiquitous Technol., vol. 4, No. 1, Article 26, Mar. 2020 (30 Pages).
(Continued)

*Primary Examiner* — Jimmy T Vu (57) ABSTRACT

The invention is directed to a lighting-arrangement control device (100) for controlling operation of a lighting arrangement (150), and configured to receive, from at least one lighting device (101.1, 101.2, 101.3, 101.4) context-sensing data (CS1, PS2) correlatable to a context of a subject within a respective sensing volume (SV1, SV2). An operation control unit (104) is configured to ascertain arrangement-status data, to select one functional operation mode from a plurality of pre-specified functional operation modes of the
(Continued)

lighting arrangement, each being associated with respective functional lighting devices and to identify as context-aware devices those lighting devices that have provided the context-sensing data relevant for the selection of the functional operation mode. The operation control unit is configured to provide, to the identified context-aware devices, first user-feedback operation-data (UF) for driving their lighting units in a user-feedback operation informing a user about the identified context-aware devices.

13 Claims, 3 Drawing Sheets

(51) Int. Cl.
*H05B 47/175* (2020.01)
*H05B 47/19* (2020.01)

(56) References Cited

U.S. PATENT DOCUMENTS

| | | | |
|---|---|---|---|
| 2018/0292520 | A1 | 10/2018 | Bermudez et al. |
| 2019/0021155 | A1* | 1/2019 | Van De Sluis .... H05B 47/1985 |
| 2019/0104597 | A1 | 4/2019 | Lu et al. |
| 2019/0182933 | A1 | 6/2019 | Lu et al. |
| 2020/0229289 | A1* | 7/2020 | Cahill ................ G06V 10/7753 |

OTHER PUBLICATIONS https://www.originwirelessai.com, "WiFi Does More. With Origin." Last Visited Apr. 5, 2023 (11 Pages).
https://clous.google.com/explainable-ai, "Introducing Example-Based Eplanations, a First-of-Its-Kind Service to Help Users Improve Model Performance by Refining Their Data," Last Visited Apr. 5, 2023 (12 Pages).

* cited by examiner

INVOLVING THE USER IN CONTEXT-SENSING INFERENCE IN A LIGHTING ARRANGEMENT

CROSS-REFERENCE TO PRIOR APPLICATIONS

This application is the U.S. National Phase application under 35 U.S.C. § 371 of International Application No. PCT/EP2021/077260, filed on Oct. 4, 2021, which claims the benefit of U.S. Provisional Patent Application No. 63/088,568, filed on Oct. 7, 2020 and European Patent Application No. 20204815.3, filed on Oct. 30, 2020. These applications are hereby incorporated by reference herein.

FIELD OF THE INVENTION

The invention is directed to a lighting-arrangement control device, to a lighting arrangement, to a method for operating a lighting-arrangement control device, to method for operating a lighting arrangement, and to a computer program.

BACKGROUND OF THE INVENTION

US 2019/0104597 A1 discloses a lighting system including a detector which is configured to obtain an indicator data of a RF signal. The detector compares the indicator data with a baseline indicator data to generate a difference value and determines a rate of change from the indicator data. The detector also determines a data metric based on the rate of change and the difference value and compares the data metric with a transition threshold to detect one of an occupancy condition or a non-occupancy condition in the area as context information pertaining to a subject or an object in the area. The lighting system also includes a light source, which is controlled in response to the detected one of the occupancy condition or the non-occupancy condition in the area.

SUMMARY OF THE INVENTION

It would be desirable to improve user controllability of a context-sensing based lighting arrangement by a user.

A first aspect of the present invention is formed by a lighting-arrangement control device that is suitable for controlling operation of a lighting arrangement. The lighting-arrangement control device comprises an input unit for receiving, from at least one external lighting device, respective context-sensing data that is correlatable to a context of an object or subject within a respective sensing volume. The at least one external lighting device includes a lighting unit and a context-sensing unit that is configured to provide the context-sensing data. The context sensing data is determined from a RF-signal transmission between the at least one lighting device comprising the context-sensing unit and at least another external lighting device, and the sensing volume depends on the location of the lighting device performing the RF-signal transmission and the lighting device that includes the context-sensing unit.

The lighting-arrangement control device also comprises an operation control unit that is configured to ascertain arrangement-status data indicative of an state of the lighting arrangement. The operation control unit is also configured to select, using the respective context-sensing data and the arrangement-status data, one functional operation mode from a plurality of pre-specified functional operation modes of the lighting arrangement, wherein each functional operation mode is associated with operation of one or more respective functional lighting devices. Further, and in dependence on the selected functional operation mode and the context-sensing data, the operation control unit is configured to identify as context-aware devices those at least two lighting devices that have performed the RF-signal transmission for determining the context-sensing data that has been relevant for the selection of the selected functional operation mode.

Further, the operation control unit is also configured to generate and provide, to the functional lighting devices, function-operation data for operating of their lighting units in accordance with the determined selected functional operation mode.

In addition, the operation control unit is configured to generate and provide, to the identified context-aware devices, first user-feedback operation-data for driving their respective lighting units in a user-feedback operation. The user-feedback operation provides to a user information about the identified context-aware devices.

In computer science, context awareness refers to the idea that computers can both sense, and react based on particular changes in their environment. Devices may ascertain information about the environment in which they are operating, and using predetermined rules, or an intelligent stimulus, react accordingly. In other words, context-awareness refers to the ability of a device, such as the lighting-arrangement control device, to sense or ascertain, and to act upon information about its environment. This information about the environment is referred to as context and can be used to enable selective responses based thereon. The context is defined in general as any information that can be used to characterize the situation of an entity, such as an object or a subject, in a given environment, such as the sensing volume. In particular, in the case of the lighting-arrangement control device of the first aspect, context refers to information pertaining to the subject or object in the sensing volume that can be sensed using a sensing device or a sensing arrangement. Therefore, the context characterizes or is indicative of a state of an entity, such as a subject or an object, within the sensing volume. The state is relevant to the interaction between a user and an application, in this case, operation of a lighting arrangement.

In addition to the context-sensing data, which is indicative of the context of a subject or object in the sensing volume, the lighting-arrangement control device is also configured to ascertain the arrangement-status data, which is indicative of the state of the lighting arrangement, i.e. of information that is used to characterize the situation or the operation, including past operation, current operation, or expected operation, of the devices of the arrangement.

Thus, the lighting-arrangement control device is configured to control operation of the lighting arrangement by selecting one of a plurality of available functional operation modes, in dependence on a context of an object or subject, such as a user, and on a state of the lighting arrangement. The context-sensing data is provided by the context-sensing unit of the lighting device and comprises data that is correlatable, i.e. that varies in a predictable manner, to a context such as a given activity or current status of the subject in the sensing volume around the lighting device. Each of the plurality of operation modes is associated to a respective subset of lighting devices, referred to as functional lighting devices, and which operate in accordance with respective predetermined lighting parameters, such a illumination intensity, spectral content, or color temperature.

The selected functional operation mode is often referred to as a "scene" or "light scene" which may or may not be a predetermined light scene.

The lighting-arrangement control device, in addition, is advantageously configured to inform the user about those lighting devices that have actively contributed to the selection of the selected functional operation mode. These lighting device are identified as, and herewithin referred to, as context-aware devices. The user who is typically subject to context detection for being present in a given sensing volume, is informed by means of the user-feedback operation about those context-aware devices, which give rise to the currently selected functional operation mode. This user information is performed by driving operation of the lighting units of said context-aware devices in accordance with a pre-specified user-feedback operation. The user-feedback operation thus provides coded information. Knowledge of the code can be conveyed by usual means such as operation instructions provided with the lighting-arrangement control device or can be pre-specified by the user, for instance upon setting up the lighting arrangement.

The lighting-arrangement control device of the first aspect of the invention thus assists a user of the lighting arrangement in understanding how a given functional operation mode has been selected. This is effected by driving operation of those lighting devices which have actively participated in the detection of the particular context that has triggered said selected functional operation mode to perform the user feedback operation. E.g., the lighting units can be driven to performing predetermined light effects coding the user information. The user information provides the basis for enabling the user to further improve the control operation of the lighting-arrangement control device in controlling the context-sensing based lighting arrangement.

In the following, embodiments of the lighting-arrangement control device, herewithin also referred to as control device, of the first aspect of the invention are described.

The context of the subject or object that is sensed by the context-sensing unit, is, in different embodiments, indicative of one or more of the following: location, activity, time, identity, user and role, device state, or any combination thereof.

In an embodiment, the context-sensing data is obtained from RF-signal transmission between the two external lighting devices and provided to the input unit by that external lighting device that comprises the context-sensing unit. Alternatively, or additionally, context-sensing data can be determined using a plurality of RF-signal transmissions between two or more lighting devices, that are analyzed cooperatively to sense the current context within the sensing volume. For instance, context-sensing unit is configured to provide context-sensing data indicative of a presence or movement of the object or subject in the sensing volume. The sensed context is, in this example, a state of presence or absence or movement of the subject or object. This context can be determined using RF-signal transmissions between two lighting devices. In another example, the context-sensing unit is additionally or alternatively configured to provide context-sensing data indicative of an activity of the subject or object in the sensing volume which may also include information about movement direction, velocity, position tracking, etc. Such context-sensing data is for instance indicative a context associated to a heart-beat rate, to a breathing rate, to movement pattern of an object or subject or a particular part thereof. Determination of these or other kind of contexts may require RF-signal transmissions between more than two lighting devices, depending on factors such as a desired resolution of the context.

In an embodiment, the lighting-arrangement control device is configured to select more than one functional operation mode from the plurality of pre-specified functional operation modes, for instance when the lighting arrangement is implemented in different rooms each having one or more sensing volumes or sensing zones, wherein the detection of a context, such as a presence, movement or activity, in each of the sensing volumes can be performed independently of each other, such that different functional operational mode can be selected for different sensing zones or rooms.

In a particular embodiment, the lighting-arrangement control device is a stand-alone device with no further functionality as the one described above. Alternatively, in another embodiment, the lighting-arrangement control device is integrated into a router, a bridge, a hub or any other device suitable for controlling wireless communication between the devices of the lighting arrangement. In an alternative embodiment, the lighting-arrangement control device is integrated into one of the lighting devices of the lighting arrangement. In another embodiment, however, the lighting-arrangement control device is integrated into a non-lighting device of the lighting arrangement, such as a switching device or a sensing device for controlling operation of one or more lighting devices.

In an embodiment, the context-sensing unit is a radiofrequency sensing unit. In this embodiment, the context-sensing data received is signal-quality data indicative, for example, of a radio signal strength indicator (RSSI) of radio signals received by the lighting device during the RF-signal transmission from another lighting device, or of a channel state indicator (CSI) of a wireless communication link between the lighting device comprising the radiofrequency sensing unit and another lighting device capable of transmitting RF-signals, or of any other suitable signal quality metric that is correlatable to a particular context such as, but not limited to a presence or a movement of an object or subject within a given sensing volume. In these particular examples, the context-sensing unit is, for instance, a RSSI determination unit or a CSI determination unit or a suitable-signal-metric determination unit respectively.

In an embodiment, the state of the lighting arrangement determined from the ascertained arrangement-status data includes data indicative of a position of the lighting devices, or of an operation status of the lighting units, or of a time of operation, or of an operation status of the context-sensing units or of pre-specified user preferences associated to a respective operation mode of the lighting arrangement, or any combination thereof. The operation control unit of this particular embodiment is thus configured to ascertain, using the arrangement status data, data indicative of the position, or of the operation status of the lighting units, or of the time of operation, or the context-sensing units or of the pre-specified user preferences associated to a respective functional operation. The data indicative of position of the lighting devices is, in an embodiment, indicative of a room or a space in which the lighting device is installed. Typically, a presence-sensing function is performed by lighting devices located in a given room, or in a specific part of the room that is defined as a sensing volume. For instance, a small kitchen or a bathroom is often considered as a single sensing volume, whereas in a large living room with a dining table, the room can be divided into several specific sensing volumes such as a zone around a sofa and a TV and a zone around the dining table. Also a corridor can be divided into several areas, depending on the length. For instance, a movement of a user in the corridor is detected by the lighting devices and this detection is used to select a functional operation mode that results in the lights of the corridor or of part of the corridor to be switched on. This selection also depends on the current state of the lighting arrangement, e.g. on whether the lighting devices are already on, on the time of operation (e.g. day or night) on which the detection has occurred, etc. The arrangement-status data also includes, in another embodiment, data indicative of the operation status of the lighting units, e.g. whether the lighting units are currently on or off, the current lighting parameters of the lighting units (e.g. intensity, color, color temperature, etc.), any pre-specified or programmed usage conditions, such as allowed usage time-windows, or predefined lighting scenes, which are examples of user preferences associated to a respective operation mode. Alternatively or additionally, the arrangement-status data also includes data indicative of an operation status of the context-sensing unit, e.g. whether the context-sensing units are currently on or off, activity data in the form of sensing-data obtained during a predetermined time-span, which can be used for determining a baseline value indicative of a reference situation, e.g. no presence of subjects in a given area. Also, the arrangement status data may be indicative of whether other subjects are already present within the sensing volume or of a number of subjects present in the sensing volume. The user can also indicate certain user preferences associated to a respective functional operation mode. For example, a user may not want that a particular lighting devices operates in the user-feedback operation, for instance if a lamp is at a safety critical location requiring perfect undisturbed lighting. Similarly, the user can indicate, as a user preference, that a reading light should not be driven in the user-feedback operation, if the context-sensing data is indicative of the user reading a book. The first user-feedback operation-data is thus generated taking into account the user preferences.

In another embodiment, which can further include any of the technical features described above, the first user-feedback operation-data generated and provided by the operation control unit is further configured to drive the lighting units of the context-aware devices in a user-feedback operation further informing the user about a type of context sensed in the corresponding sensing volume. This is preferably performed by implementing a predetermined light effect in the lighting units of the lighting devices identified as context-aware devices and which corresponds to the type of context sensed, such as a movement, a presence of a number of people, an activity, a heart-beat rate, a breathing rate, etc. For instance, the first user-feedback operation-data is configured to drive the lighting units of the context-aware devices to perform a predetermined light effect that includes blinking, i.e., consecutively turning off and on the lighting units of the identified context-aware devices, a number of times that depends on the number of people detected in the given sensing volume. In another example, the context-sensing data provided by the context-sensing units are indicative of a particular context that is a heart-beat of a subject in the sensing volume and the first user-feedback operation-data is configured to drive the lighting units so that they operate in a manner correlated to the sensed heart-beat. For instance, if based on a detection of an accelerated heart-beat, the selected functional operation mode is a "training-mode" for which the lighting parameters of the lighting devices have been pre-specified for a user-defined training environment, the lighting units of the context-aware devices are instructed to blink at a given frequency and/or color to indicate to the user that the detection of the accelerated heart-beat has been used to select the training mode.

In another embodiment, which can be combined with any combination of the technical features described above with respect to the different embodiments of the lighting-arrangement control device, the operation control unit is further configured to generate and provide, to the functional lighting devices, second user-feedback operation-data for driving the respective lighting units of the functional lighting devices in a user-feedback operation informing a user about the functional lighting devices. The provided second user-feedback operation-data is therefore used to drive a pre-specified user-feedback operation of the respective lighting units of the functional lighting, which informs the user about those lighting devices which are operable in the selected functional operation mode that has been selected using the context-sensing data. This is preferably performed by implementing a predetermined light effect in the lighting units of the functional lighting devices. In a preferred embodiment, the lighting-arrangement control device determines the selected functional operation mode and identifies the functional lighting devices and the context-aware devices, then drives operation of the context-aware devices in a user-feedback operation informing a user about the context-aware devices, then drives the respective lighting units of the functional lighting devices in a user-feedback operation informing a user about the functional lighting devices, and finally drives operation of the respective lighting units in accordance with the selected functional operation mode. In this way, the lighting-arrangement control device is advantageously configured to inform the user about the chain of actions that have resulted in the operation of some of the lighting devices in the selected functional operation mode. This better understanding of how the determination has been perform allows the user to take action for correcting a selection of an undesired or erroneous functional operation mode.

In another embodiment, the second user-feedback operation-data generated and provided by the operation control unit is further configured to drive the lighting units of the functional lighting devices in a user-feedback operation further informing the user about the selected functional operation mode. This is preferably performed by implementing a predetermined light effect in the lighting units of the functional lighting devices that corresponds to the selected functional operation mode. This allows the user to have more information about the lighting arrangement and the selection of the selected functional operation mode, since the user receives information pertaining to, at least, the lighting devices identified as context-aware devices, to those identified as functional lighting devices and to the selected functional operation mode. As a non-limiting example, lighting devices located on night tables in a room detect that a user has woken up and has sat up. The arrangement status data, in particular the current time of operation and the status of the lighting devices, is indicates that it is night time, and that all of the lights in the room, in the corridor and in the toilet are off. This information is used to select a functional operation mode in which the lighting devices in the bathroom are turned on and also lights of the corridor leading to the bathroom are turned on with a relatively low light intensity. The lighting-arrangement control device drives operation of the lighting devices on the night tables to perform a predetermined light effect, indicating that those lighting devices have been actively involved in the context sensing, and also drives operation of the lighting devices in the corridor, and eventually also in the bathroom, to perform another predetermined light effect for indicating that those are the lights that will be turned on as a result of the movement detection. For instance, when based on the arrangement status data, the lighting-arrangement control device is aware that the bathroom lights are already on, e.g., because there is another person using the bathroom at that time, the user-feedback operation is modified so that the bathroom lights are not instructed to perform the predetermined light effect, since this could annoy the person in the bathroom, or lead her to think the lights are malfunctioning.

In another embodiment in accordance with the first aspect of the invention, the operation control unit is further configured, upon provision of the second user-feedback operation-data, to determine an occurrence of a predetermined context, in particular a user related context, such as a predetermined movement in the sensing volume using suitable context-sensing data and to provide the function-operation data only in response to determining the occurrence of the predetermined context. This particular embodiment is therefore configured to provide the function-operation data to the lighting devices identified as functional lighting devices only upon detection of the occurrence of the predetermined user-related context, thereby enabling the user to confirm in situ, that she or he indeed wants the lighting arrangement to operate in accordance with the selected functional operation mode. For instance, the user can confirm the selected functional operation mode by raising an arm, waving a hand or any other movement that has a foreseeable impact in the context-sensing data provided by the identified context aware devices. In another embodiment, the context-sensing data for confirming the selected functional operation mode after the provision of the second user-feedback operation data is provided by a voice-recognition unit, and is indicative of a predetermined voice instruction suitable for confirming the selected functional operation mode The occurrence of the predetermined context is detected using the context-sensing data and this detection triggers the provision of the function-operation data for operating of the respective lighting units of the functional lighting devices in accordance with the selected functional operation mode.

In another embodiment, the lighting-arrangement control device determines, based on the provided context-sensing data, a particular context in which the user has moved her head to look at the lamps or has provided an agreed gesture upon noticing the light effect in the user-feedback operation. Upon inferring that the user is now aware of the context-aware devices, the user-feedback operation is terminated. The lighting-arrangement control device is then advantageously configured to provide user feedback or context indicating that she has noticed the light effect can also be given via a voice command and the light effect of the user-feedback operation is then stopped.

Following the example of the detection of a user-related context involving a user sitting up at night and thus selecting a corresponding functional operation mode for driving operation of the lights in the corridor and in the bathroom, after having provided the second user-feedback operation-data that causes the functional lighting devices, i.e., the lights in the corridor and optionally also in the bathroom to perform a predetermined light effect, the user indicates whether she or he wants to stand up and go to the bathroom or not by moving in a predetermined manner, like raising an arm or waving a hand. Upon detecting the occurrence, within a predetermined time span, of said pre specified context, in this case a movement, the operation control unit provides the function-operation data to the functional lighting devices. If the occurrence of the movement is not detected or a pre-specified context, such as a movement or a voice instruction, that correspond to an "ignore" instruction is detected, the function-operation data is not provided and the functional lighting devices do not change their operational state. In another example, during night, the lighting-arrangement control device determines, using the context-sensing data, that the user is sitting up on the bed, e.g., by WiFi RF-sensing detecting the relative movement of the upper body. The light on the side-table next to the user blinks gently with low brightness to highlight that the sitting-up event has been detected next to it. Before activing an "anti-stumbling" light scene as selected functional operation mode, which involves illumination provided by the ceiling light and the corridor light, these two lights pick up the same rhythm as the light in the side-table and also start gently blinking. If the user waves his hand, the light scene is activated before the user gets out of bed. If the user lays back on the bed again, the side-table light starts blinking again for a second and no action is taken. If the user does not wave his hand, the scene is not activated. It will be understood that this is just an example and that other alternative light effects, light scenes, contexts, movements or times can also be used in the frame of this invention.

In an embodiment, the operation control unit has access to a list or lookup table comprising entries for the predetermined functional operation modes in relation to the detection of contexts in a corresponding sensing volume and also to a state of the lighting arrangement. The list or look-up table is, in an embodiment, stored in a storage unit of the lighting-arrangement control device. In an alternative embodiment, the list or table can be edited by the user, for example via a dedicated application in a computer or a smart phone. The lighting arrangement can be portioned in different rooms or illumination areas and each of these may have different associated functional operation modes, which are preferably edited or created by a user, either from scratch or from a predefined set of standard functional operation modes. For instance, a predefined set of set of standard functional operation modes for a living-dining room includes a "dining" mode, a "tv-watching" mode, and a "reading" mode. The user is enabled to change the lighting parameters associated to each of these modes, as well as to add or remove the functional lighting devices associated to each functional operation mode. The users can also add functional operation modes to the list that fit their needs, such as, for instance, a "training" mode, if the living room is also used to exercise.

In another embodiment, the operation control unit additionally or alternatively comprises a neural network unit that is configured to receive as input data, the context-sensing data provided by the context-sensing unit and the arrangement status data for detecting changes in operation conditions of the lighting devices of the lighting arrangement that are correlatable to changes context-sensing data, and to select the functional operation mode in dependence thereon. For instance, during a training-phase of the neural network unit, the neural network unit monitors context-sensing data and correlates said data with changes in the operation of the lighting devices. For example, the lighting-arrangement control device detects a user entering the living room and sitting on a sofa. Soon thereafter the lights in the living room are dimmed and a lighting unit, e.g., a LED strip coupled to the TV, is switched on. During operation, when a user enters the living room and sits on a sofa, the lighting-arrangement control device, using the learned behavior, selects a functional operation mode where the living room lights are dimmed and the lighting unit coupled to the TV is switched on. More advantageously, the lighting-arrangement control device requires user feedback in the form of a pre-specified context such as a movement as explained above, before actually operating the lighting arrangement in the selected functional operation mode. This can also depend on whether other people are detected in the living room, for example at a dining table. In this particular case, the lighting arrangement may decide not to dim the lights illuminating the dining table. A suitable training of the neural network unit is advantageous for treating such situations. In general, a machine learning algorithm, such as a neural network, "learns" how to manipulate various inputs, possibly including previously generated outputs, in order to generate current new outputs. As part of this learning process, the algorithm receives feedback on prior outputs and possibly some other inputs. Then, the neural network unit or the like calculates weights to be associated with the various inputs (e.g. the previous outputs, feedback, etc.). The weights are then utilized by the neural network unit to manipulate the inputs and generate the current outputs intended to improve some aspect of the performance of the lighting arrangement in a desired manner. For machine learning, the training data is the discrepancy between the outputs of a present system and the outputs of a trusted system. Machine learning techniques such as artificial neural networks are applied to reduce the discrepancy. Training can take place ahead of the time (before product re-lease/commissioning) or in the field as an on-going optimization to reduce false positives in detecting a subject or selecting a functional operation mode. Decisions taken by neural networks are not always in line with the user's thinking or intention or transparent to the user. The neural network or artificial intelligence (AI) is sometimes regarded by the user as a black box that makes decisions and the user has hardly any way to figure out why a decision has been made, and how to reproduce or avoid them in the future. Advantageous embodiments of the lighting-arrangement control device of the first aspect enable the user to understand AI driven selections of functional operation modes, particularly by highlighting the lighting devices that contributed or are part of a certain decision, thereby improving the technology transparency and reducing friction between the user and the AI driven operation control unit.

In some cases, the neural network unit might not be capable of selecting a functional operation mode, typically because there are two or more functional operation modes that could be selected based on the arrangement status data and the context-sensing data or because the neural network unit has reached an indecisive conclusion with respect to the functional operation mode to be selected. In a particularly advantageous embodiment, when a functional operation mode is not selectable by the neural network unit, the operation control unit is further configured to generate and provide to one or more lighting units, failed-determination data for driving said lighting units in a third user-feedback operation informing the user about the inability to select a functional operation mode. This is preferably performed by implementing a predetermined light effect in the lighting units of said lighting devices. The lighting devices need not be the functional lighting devices or the context-aware devices, but any predetermined subset of lighting devices, which in some cases coincides with the functional lighting devices or the context-aware devices. The predetermined light effects are an indication to the user that no functional operation mode has been selected. In another embodiment, the predetermined light effects are indicative of those operation modes that could be selected functional operation modes. In a preferred embodiment, the operation control unit is further configured, in response to the provision of the failed-determination data, to determine an occurrence of context such as a predetermined movement of an object or subject in the sensing volume using the context-sensing data provided by the context-aware devices, and to select the selected functional operation mode in dependence on the determined occurrence of the context. The user indicates whether she or he wants to the lighting arrangement to consider one of the suitable operation modes as selected functional operation mode, for instance by moving in a predetermined manner, like raising an arm or waving a hand, or any other suitable movement. Upon detecting the occurrence, within a predetermined time span, of said pre specified context, the operation control unit provides the function-operation data corresponding to the detected context, e.g. movement, to the functional lighting devices. Preferably, if the occurrence of the context is not detected or a pre-specified context that corresponds to an "ignore" instruction is detected, the function-operation data is not provided and the functional lighting devices do not change their operational state. In this embodiment, the user is involved in a decision-making process of the neural network unit. The lighting-arrangement control device highlights the struggle in reaching a decision regarding the selection of the functional operation mode and requires a feedback from the user before proceeding.

In a particular embodiment, which may further include any of the technical features described with respect to the embodiments disclosed above, the operation control unit, upon determining that the selected functional operation mode belongs to a pre-specified list of sensitive operation modes, is configured to generate and provide, to one or more lighting units, sensitive-mode-detected data for driving their lighting units in a user-feedback operation informing the user about the determination of a sensitive operation mode as a selected functional operation mode. The lighting devices need not be the functional lighting devices or the context-aware devices, but any predetermined subset of lighting devices, which in some cases coincides with the functional lighting devices or the context-aware devices. The list of sensitive operation modes is generally pre-specified by the user and the definition of "sensitive" strongly varies among cultures, age and background of the user. For instance, a user would define a operation mode labeled as "romance" in which lights are dimmed in a room when two people are detected on a bed as "sensitive", whereas another user would define an operation mode labeled "toilet visit" as "sensitive". For example, once a functional operation mode that belongs to a list of pre-specified sensitive operation modes is selected, e.g. "toilet visit" or "romance", the context-aware devices are instructed to perform a light effect to signalize the detection event, and then either wait for feedback or, in another embodiment, erase the data collected and signalize via a predetermined light effect that the accidentally collected data, for example in form of arrangement-status data or the context-sensing data collected during that time just got automatically erased. If the detected event is prolonged, such as in the case of "romance", the light effect can held back until the activity is terminated, to signal the user that the control device is actively erasing the collected data, preferably also including the context-sensing data. This embodiment is particularly advantageous in lighting arrangements which are further configured to store the context-sensing data for tracking or monitoring activities in the sensing volume. The storage can be performed, in a particular embodiment, at a storage unit of the lighting-arrangement control device, or at an external storage unit. The user may then indicate that certain functional operation modes are sensitive and the lighting-arrangement control device, upon selecting a sensitive functional operation mode, provides the user with a suitable interface for indicating that he or she does not want the context-sensing data to be stored or used for tracking or monitoring purposes. For example, in the case where the functional operation mode "toilet visit" has been labeled as sensitive, the lighting-arrangement control device, using the context-sensing data, may not be able to determine whether the presence of a person in the bathroom corresponds to a sensitive toilet visit as such, for which the user does not want the associated context-sensing data to be stored, or to an activity that is not considered as sensitive by the user, such as for instance cleaning the toilet, for which there should in principle be no restrictions for storing the context-sensing data. The user can here indicate in a predefined manner, whether the user is currently in the bathroom performing sensitive activity where no data should be stored or not.

In a particular embodiment, the operation control unit is further configured, in response to the provision of the sensitive-mode-detected data, to determine an occurrence of a predetermined context, such as a movement or an activity of a subject, in the sensing volume using the context-sensing data provided by the context-aware devices and to provide the function-operation data only in response to determining the occurrence of the predetermined context.

Another embodiment of the lighting-arrangement control device is advantageously configured to use the first user-feedback operation-data to inform or instruct the user on which sensing volumes are currently being used by the lighting arrangement; this is useful both either during an arrangement setup-phase or if the neural network unit deems it necessary to perform a dynamic zone reconfiguration of the sensing volumes. In the case in which the user is configuring the context-sensing units, for instance for the first time, and thereby selecting which subset of lighting devices are assigned to which sensing volumes or zones, the user's choices can be signified real-time by driving operation of the context-aware devices in a user-feedback operation comprising activating light effects that show RF sensing interactions among the lighting units of the corresponding context-aware devices.

For example, to show the RF sensing interactions, a first, second and third lighting devices contributing to a heartbeat sensing area close-by the couch are driven to blink at the same pace with a red light effect signifying heartbeat, while another lighting device such as a LED strip, also close-by the couch, together with a fifth, sixth and seventh lighting device above the dining table show a very fast back-and-forth sweep across the three lighting units to signify that the latter lighting devices form is a fall-detection zone.

A different case relates to a use of the first user-feedback operation-data to inform the user about on-the-fly configuration changes. A typical autonomous configuration change may involve—based on the context inferred by the neural network unit- to dynamically and temporarily reassign the lighting devices associated to the different sensing volumes. In this embodiment, the first user-feedback operation-data is used to inform the user of this choice through light effects. In a particular, non-limiting example, the lighting arrangement is installed in an open kitchen connected to the living room; if only one person is present in the combined zone, for instance working in the kitchen, the sensing volume is defined by both the lighting devices in the kitchen as well as the lighting devices in living room. Using all lighting devices gives optimal performance of fall detection. If a second person however enters the space and sits down at the couch in the living room, the sensing volume is split into a first sensing volume comprising just the lighting devices in the kitchen and a second sensing volume associated to the lighting devices in the living room. Subsequently, presence, movement, vital sign monitoring, or any other context-sensing function is performed separately for both sensing volumes. It may be that the lighting arrangement is now no longer able to perform fall detection accurately compared to the case where all lighting units were cooperatively monitoring a single sensing volume. This is however not a problem since a second person is anyway present in the room. The light effect driven by the first user-feedback operation-data to explain this automatic reconfiguration process to the user comprises, in a particular embodiment, operating the lighting units of the combined zone first displaying the same first color setting, followed by only the newly reassigned lights being on (with a second color setting to signify the re-assigned sensing volume), followed by all the lights being on displaying their color based on their respective detection zone (to indicate the new zones), and finally the lighting-arrangement control device causing a transition back to the selected light scene or operation mode.

Another example of re-assignment of sensing volumes in dependence on context-sensing data is breathing detection based on the number of persons in a bed. If a single person is in a double bed, the breathing detection is performed from a first lighting device located on side table to the left of the bed with a second table light located to the right of the bed. This is the optimal arrangement for breathing detection. However, if a second person joins the first one, the lighting-arrangement control device detects the presence of now two people and the system subsequently reconfigures the RF sensing volumes so that the first light forms a first breathing detection zone with the ceiling light (covering the left half of the bed) and the second light forms a second breathing detection zone with the ceiling light (covering the right half of the bed). Using the first user-feedback operation-data, these configuration changes in the sensing volumes can be indicated as in the other reconfiguration example given above, or alternatively by visually signifying first the RF sensing messages between the two lights on the bed's side-tables, followed by first messages shot between the left side-table light and ceiling light in a first color, followed by signifying second messages shot between the right side-table light and ceiling light in a second color. In the example just described, the first person may go first to sleep in first detection zone, while second person is still reading his social media in bed. As breathing detection requires absence of any other major movement in the zone, it can only be performed for the first person. Therefore, the first zone switches to breathing monitoring while the second zone for the second person remains with performing true presence detection (with low latency) for lighting control or gesture recognition.

A second aspect of the present invention is formed by a lighting arrangement that comprises a lighting-arrangement control device in accordance with the first aspect of the invention.

The lighting arrangement also comprises a plurality of lighting devices having respective lighting units, wherein at least one lighting device also comprises a context-sensing unit configured to provide context-sensing data determined from a RF-signal transmission between said lighting device and at least another lighting device, and that is correlatable to a context of an object or subject within a respective sensing volume; and wherein the lighting devices are configured to operate in accordance with received function-operation data and the first user-feedback operation-data.

The lighting arrangement of the second aspect also shares the advantages of the control device of the first aspect or of any of its embodiments.

The lighting arrangement is advantageously configured to perform both a lighting function as well as a context sensing function, which is advantageously used to control operation of the lighting function. Context sensing technology can be used for a wide range of applications, for instance, for people detection and counting, activity recognition or even breathing rate and heart beat determination using the context-sensing data provided by the context-sensing units of the lighting devices.

In an embodiment, the lighting arrangement is a wireless communication network in accordance with an IEEE 802.11 communication protocol, also referred to as WiFi. In another embodiment, the lighting arrangement is a wireless communication network referred to as low-rate wireless personal area network (LR-WPAN) in accordance with an IEEE 802.15.4 communication protocol, including, but not limited to Zigbee, BLE, Thread, etc. In another embodiment, the lighting arrangement is operable in accordance with two or more different communication protocols. The context-sensing data is determined using the RF-signal transmission of wireless communication signals in accordance with the respective wireless communication protocol.

In an embodiment, the lighting devices are configured to provide, at predetermined points in time, context-sensing data indicative of a signal quality metric, such as but not limited to, RSSI or CSI, which are is determinable from the RF-signal transmissions between lighting devices. In this particular embodiment, the context-sensing data is presence-sensing data that is evaluated at the lighting arrangement control unit to determine an occurrence of a movement or a presence of a subject or object in a sensing volume. The lighting arrangement control unit thus receives from a plurality of lighting devices context-sensing data, which is not necessarily indicative of a presence or movement. The control device is advantageously configured to determine which of the lighting devices has provided context-sensing data that has been relevant for the determination of a presence or a movement, and thereby to identify them as context-aware devices for a corresponding detection event in a given sensing volume. In another embodiments, the context-sensing data is indicative of a presence or movement of an object or subject in a given sensing volume and is provided upon detection of said presence or movement.

According to a third aspect of the invention, a method for operating a lighting-arrangement control device is described. The method comprises:

receiving, from at least one external lighting device having a lighting unit and a context-sensing unit, respective context-sensing data determined from a RF-signal transmission between the at least one external lighting device and at least another external lighting device, and that is correlatable to a context, such as presence or a movement, or an activity, of an object or subject within a respective sensing volume; and ascertaining arrangement-status data indicative of a state of the lighting arrangement;

selecting, using the respective context-sensing data and the arrangement-status data, one functional operation mode from a plurality of pre-specified functional operation modes of the lighting arrangement, each functional operation mode being associated with operation of one or more respective functional lighting devices;

identifying, in dependence on the selected functional operation mode and the context-sensing data, context-aware devices corresponding to those at least two lighting devices that have performed the RF-signal transmission for determining the context-sensing data that has been relevant for the determination of the functional operation mode;

generating and providing, to the identified context-aware devices, first user-feedback operation-data for driving their lighting units of the context-aware devices in a user-feedback operation informing a user about the context-aware devices; and generating and providing, to the functional lighting devices, function-operation data for operating of their lighting units in accordance with the selected functional operation mode.

The method of the third aspect thus shares the advantages of the lighting-arrangement control device of the first aspect of the invention or of any of its embodiments.

A fourth aspect of the invention is formed by a method for operating a lighting arrangement having a one or more lighting devices having a respective lighting unit, at least one of which further comprises a context-sensing unit. The method comprises:

providing context-sensing data determined from a RF-signal transmission between the lighting device having the context-sensing unit and at least another lighting device, and that is correlatable to a context of an object or subject within a respective sensing volume;

performing the method of the third aspect; and operating the lighting devices in accordance with the received function-operation data and the first user-feedback operation-data.

The method of the fourth aspect thus shares the advantages of the lighting arrangement of the second aspect of the invention or of any of its embodiments.

For instance, in an embodiment of the method of the fourth aspect, the method includes operating the lighting devices in accordance with the received second user-feedback operation-data, or with the received failed-determination data, or with the received sensitive-mode-detected data or with any combination thereof.

A fifth aspect of the invention is formed by a computer program comprising instructions which, when the program is executed by a computer, cause the computer to carry out the method of the third or the fourth aspect of the invention.

It shall be understood that the lighting-arrangement control device, the lighting arrangement, the method for operating a lighting-arrangement control device, the method for operating a lighting arrangement, and the computer program provided herein may have similar and/or identical preferred embodiments, as defined herein.

It shall be understood that a preferred embodiment of the present invention can be any combination of dependent claims and/or embodiments provided herein with any independent claims and/or any other embodiments provided herein.

These and other aspects of the invention will be apparent from and elucidated with reference to the embodiments described hereinafter.

DETAILED DESCRIPTION OF EMBODIMENTS

Context-aware systems are concerned with the acquisition of context (e.g. using sensors to perceive a situation), the abstraction and understanding of context (e.g. matching a perceived sensory stimulus to a context), and application behavior based on the recognized context (e.g. triggering actions based on context). As the user's activity and location are crucial for many applications, context awareness has been focused more deeply in the research fields of location awareness and activity recognition. Context is therefore related to information that is ascertainable using a suitable sensing device or sensing arrangement.

Figure 1:
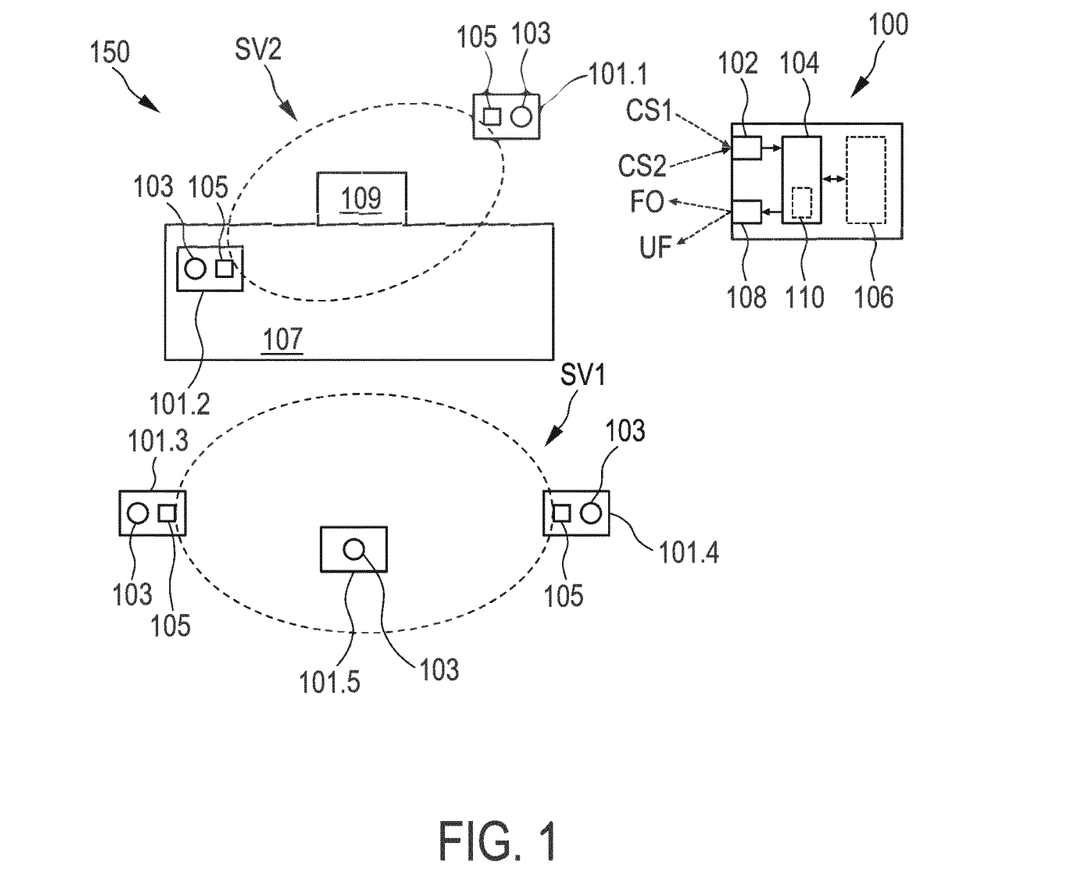
FIG. 1 shows a schematic representation of a lighting arrangement comprising a plurality of lighting devices and a lighting-arrangement control device.

FIG. 1 shows a schematic representation of a lighting arrangement 150 that comprises a plurality of lighting devices 101.1 to 101.5 and a lighting-arrangement control device 100 for controlling operation of the lighting arrangement in the terms described below.

The lighting arrangement 150 shows is implemented in a room, such as an office which has a desk 107 and a chair 109. Lighting device 101.1 is a floor lamp, lighting device 101.2 is a desk lamp, and lighting devices 101.3, 101.4 and 101.5 are ceiling luminaires. All lighting devices 101.1 to 101.5 include a lighting unit 103 for illumination purposes. Lighting devices 101.1 to 101.4 further comprise a context-sensing unit, such as radiofrequency (RF) sensing units, for providing context-sensing data CS1, PS2 that is correlatable to a context, e.g. to an activity of status of an object or subject within a respective sensing volume SV1, SV2. The context-sensing data is determined from a RF-signal transmission between the at least one external lighting device having the context sensing unit (105) and at least another external lighting device.

Context-sensing data is in different context-sensing units, indicative of a user-related context such as a location or location coordinate or change in location; distance; displacement; positional characteristics, characteristics associated with movement (e.g. change in position/location) of the subject or object; lineal or rotational speed; lineal or rotational acceleration; motion direction or angle; azimuth; rotation; path; deformation or transformation such as a shrinking or an expansion; gait, gait cycle, walking rate; motion of head, hand, mouth chest, eye or other body part; repeated, periodic, pseudo-periodic, impulsive, sudden, transient or fall-down motion; period or frequency of motion; history of motion; motion type or motion classification; behavior, transient behavior; time trend, temporal profile, temporal characteristics; occurrence of a predetermined event such as a fall-down event, a security event, an accident event, a tracking event, a door-open event, a door-close event, a window-open event, a window-close event; change of a physical parameter; time such as a starting time, an ending time, or a time window; frequency, frequency spectrum, frequency characteristics; presence or absence, proximity, approach, receding; identity/identifier of an object or subject; a composition of the object; breathing rate, heart-beat rate, interval or variability of heart or breathing rate, tidal volume, depth of breath, inhale time, exhale time, inhale time to exhale time ratio, gesture such as handwriting motion, internal organ motion, a motion trend, airflow rate; similarity score, distance score; Euclidean distance or weighted distance, statistical distance; statistical indications such as (auto)correlation or (auto)covariance; size, length, area or volume, form, tag; physical state, health state, well-being state, an emotional state, a mental state; and/or another information.

As a non-limiting example, the lighting arrangement 150 is a connected wireless lighting arrangement where communication between the different devices of the lighting arrangement is performed in accordance with a predetermined wireless communication protocol, such as WiFi, BLE, Zigbee or the like. Optionally, the lighting arrangement includes a router, a bridge or any other suitable communication control device, which is optionally incorporated in the lighting-arrangement control device 100. For detecting a predetermined context, such as a presence or movement within the respective sensing volumes, the lighting devices rely on context-sensing, such as radiofrequency sensing, for example using RF-signals exchanged to determine a signal quality value of a signal-quality metric, such as, but not limited to RSSI or CSI, which are influenced by a presence or movement of the subject within the sensing volume, mainly due to an absorption of the signal by the subject located between an emitting lighting device and a receiving lighting device. The signal quality value is provided as part of the context-sensing data to an input unit 102 of the lighting-arrangement control device 100. The lighting arrangement comprises an operation control unit that is configured to ascertain arrangement-status data indicative of a state of the lighting arrangement. The arrangement status data includes, for example, data indicative of a position of the lighting devices, or of an operation status of the lighting units, or of an operation status of the context-sensing units or of pre-specified user preferences associated to a respective functional operation mode of the lighting arrangement, or any combination thereof.

For instance, the user has pre-specified a plurality of functional operation modes, including an "enter-room" operation mode in which the lighting device 101.5, being closest to the door, turns on if there are no other lights on. The "enter-room" operation mode is associated to the sensing volume SV1. The pre-specified functional operation modes also include a "user-at-desk" operation mode in which the lighting devices 101.1 and 101.2 are turned on and the lighting devices 101.3, 101.4 and 101.5 are turned off, and that is associated to sensing volume SV2. The user may further specify other parameters, that depend on other factors, such as current time, or illumination conditions, for example via a window, etc. Upon operation, the operation control unit ascertains the current arrangement status data, including for instance, time (e.g. night) and status of the lights (all turned off).

When the user enters the room, her presence in SV1 is detected as a signature in the context-sensing data provided by at least one of the lighting devices 101.3 and 101.4. Using the context-sensing data and the arrangement status data, the operation control unit selects the "enter-room" operation mode as selected functional operation mode because it is the functional operation mode that the user has pre-specified for that set of conditions. The operation control unit then identifies lighting devices 101.3 and 101.4 as context-aware devices, since they are the lighting devices that have provided the context-sensing data based on which the selected functional operation mode has been determined. In a larger sensing volume defined by three or more lighting devices, the identified context-aware devices may be a subset of all the lighting devices associated to that sensing volume, for example, when presence is detected close to a boundary of said sensing volume.

The operation control unit 104 is further configured to generate first user-feedback operation-data FU and to provide the generated first user-feedback operation-data to the identified context-aware devices. The first user-feedback operation-data is used for driving the lighting units of the identified context-aware devices in a user-feedback operation informing the user about the identified context-aware devices. Following the example above, the operation control unit 104 generates and provides, to the identifies context-aware devices 101.3 and 101.4, user-feedback operation-data UF, in this example first user-feedback operation-data, that causes these devices to operate in a predefined manner for informing the user of the fact that those two devices have been responsible for the detection of her presence. This is performed, for example by making the lighting units 103 of the context-aware devices 101.3 and 101.4 blink for a certain time.

Further, the operation control unit is configured to generate and provide, to the functional lighting devices, function-operation data FO for operating their lighting units in accordance with the selected functional operation mode. The functional operation devices associated to the selected functional operation mode, i.e. "enter-room" is lighting device 101.5, which receives the provided function-operation data, which causes its lighting unit to turn on with predetermined lighting parameters such as light intensity, color and color temperature.

The user therefore does not need to actuate any switch to turn on lighting device 101.5 when entering the room in dark conditions and it is also informed that the lighting device 101.5 has been turned on because her presence has been detected by the lighting devices 101.3 and 101.4, which have been identified as context-aware devices.

The user enters the room as stated above and moves towards the desk 107, where she sits on the chair 109. This context, i.e. the movement of the user, causes variations in the context-sensing data provided by the context-sensing units 105. These variations are indicative of a presence of the user in sensing volume SV2. Since there is no other user in the room, especially in sensing volume SV1, the operation control unit selects, as selected functional operation mode, the "user-at-desk" operation mode. In this case the operation control unit identifies lighting devices 101.1 and 101.2 as the context-aware devices and generates and provides to them first user-feedback operation-data UF for driving their lighting units in a user-feedback operation informing a user about the identified context-aware devices. This operation involves, for example, causing the lights to blink for one or two seconds. The operation control unit also generates and provides to the functional lighting devices, the function operation data for operation in accordance with the selected functional operation mode. In this example, using the function-operation data, the lighting unit of light 101.5 is turned off and the lighting units of lighting devices 101.1 and 101.2 and turned on with predefined illumination parameters.

The exemplary operation control unit 104 unit has access to a list or lookup table 106 comprising entries for the predetermined functional operation modes in relation to the detection of context such as movement, presence activity, etc., in a corresponding sensing volume and also to an state of the lighting arrangement, as explained above. The list or table 106 can be edited by the user, for example via a dedicated application in a computer or a smart phone. Additionally, or alternatively, the operation control unit 104 comprises a neural network unit 110 that is configured to receive as input data, the context-sensing data provided by the context-sensing unit and the arrangement status data for detecting changes in operation conditions of the lighting devices of the lighting arrangement that are correlatable to changes context-sensing data, and to select the functional operation mode in dependence thereon. For instance, during a training-phase of the neural network unit, the neural network unit monitors context-sensing data CS1, PS2 from the lighting devices and correlates said data with changes in the operation of the respective lighting devices. For example, the lighting-arrangement control device detects a user entering the room at night using the context-sensing data. The user manually switches on lighting device 101.5, which is detected by the neural network unit as a change in the status of the lighting arrangement. Afterwards, the user goes to the desk and manually switches on light 101.2, after which, the user goes back to switch off light 101.5 and returns to the desk. After a couple of minutes, the user also switches off floor lamp 101.1 and stays at her desk until she leaves the room, switching off all lighting devices. All these movements and activities, i.e. contexts, are trackable using the context-sensing data provided by the lighting devices, and the changes induced in the lighting arrangement by manually switching on and off the different lighting devices are also recorded and made available to the neural network unit. A repetition of this pattern leads a well-designed neural network unit to create by itself the functional operation modes "enter-room" and "user-at-desk" defined above, such that the user does no longer need to manually switch the lighting devices when entering the room or sitting at the desk. The user is also informed about the lighting devices that have detected her presence every time a functional operation mode is selected, preferably by implementing a predetermined light effect.

Following the same example, the user also uses the room to train and specifies a "training" operation mode involving operation of the ceiling luminaires 101.3, 101.4 and 101.5 with predetermined illumination parameters specifically design for training purposes. The lighting devices 101.3 and 101.4 are advantageously configured to perform as context-sensing, advanced activity recognition, by for example, detecting a heart-beat, specific movements, location of breathing, etc. A particular lighting-arrangement control device is configured to provide first user-feedback operation-data being for driving the lighting units of the context-aware devices in a user-feedback operation further informing the user about a type of movement or presence detected. Thus, the user is informed not only of which lighting devices are identified as context-aware devices but also of which kind of movement or presence, or activity has been detected. In this example, detection of activity related to training, and involving for instance a higher heart beat rate, relatively high amount of movement within the sensing volume, etc., is signalized to the user in a different manner as the detection of the user entering the room.

An exemplary lighting-arrangement control device is also configured to generate and provide, to the functional lighting devices, user-feedback operation-data UF, in this case second user-feedback operation-data, for driving the respective lighting units of the functional lighting devices in a user-feedback operation informing a user about the functional lighting devices. For example, when the user sits on the chair 109 by the desk 107, and the operation control unit selects the functional operation mode "user-at-desk", it also generates second user-feedback operation-data UF that is provided to the functional lighting devices associated with said functional operation mode, e.g. lighting devices 101.1 and 101.2. Optionally, the functional lighting devices may further depend of the current status of the lighting arrangement. For example, if lighting device 101.5 is still on and gets turned off by the selection of the "user-at-desk" functional operation mode, the lighting device 101.5, or any other device that changes its status due to the selection of a given functional operation mode are considered functional lighting devices. Once the functional operation devices receive the second user-feedback operation-data UF, their lighting devices are configured to inform the user that they are considered functional lighting devices by implementing a predetermined light effect for a short amount of time, before adopting or returning to the functional operation mode. Thus, the user has information about those lighting devices identified as context-aware devices and those lighting devices whose operation is modified by the selected functional operation mode. Optionally, the second user-feedback operation-data is also configured to drive the lighting units of the functional lighting devices in a user-feedback operation further informing the user about the selected functional operation mode. Following the example above, lighting device 101.5 is a functional device associated to both functional operation modes "enter-room" and "training". The second user-feedback operation-data is configured to drive the lighting unit of lighting device 101.5 to perform a light effect further in dependence on the selected functional operation mode. For example, it blinks twice with a frequency of 1 Hz and emitting substantially white light in case the selected functional operation mode is "enter-room" and it blinks 4 times with a frequency of 2 Hz and emitting red light in case the selected functional operation mode is "training". This exemplary light effect signalized an increased heart-rate associated with physical activity. The user may also specify the different light effects used to signalize each functional operation mode, or the functional lighting devices associated thereto, or the identified context-aware devices.

An exemplary lighting-arrangement control device 100 is also configured, upon having provided the second user-feedback operation-data, to determine an occurrence of a predetermined context of the user in the sensing volume and to provide the function-operation data only in response to determining the occurrence of the predetermined context. This kind of operation can be established for one or more functional operation modes and enables the user to confirm the selection of the functional operation mode by, for example, performing a predetermined movement. For instance, the user moves in sensing volume SV1 and the context-sensing units also detect an increased heart rate. The operation control unit selects the functional operation mode "training" and provides the second user-feedback operation-data to the lighting devices 101.3, 101.4 and 101.5, which perform a predetermined light effect, possibly also indicative of the selected functional operation mode. However, the function-operation data is not provided to the functional lighting devices until the user confirms this selection by performing a predetermined movement that is sensed by the lighting arrangement. An example of such a movement is raising an arm or waving a hand. If the movement is not detected within a predetermined time window the operation control unit may be instructed to provide the second user-feedback operation-data or to take no further action.

There are some cases in which the neural network unit is not capable of selecting a functional operation mode, mainly because the detected conditions, in terms of sensed context and arrangement-status are not clearly indicative of one functional operation mode. In this case, an exemplary lighting-arrangement control device is configured to generate and provide to one or more lighting units, failed-determination data for driving said lighting units in a third user-feedback operation informing the user about the inability to select a selected functional operation mode. The one or more lighting units are a predetermined set of lighting unit not necessarily belonging to the context-aware devices or to the functional lighting devices. The third user-feedback operation involves, for example, signalizing to the user that no selection was possible by performing a predetermined light effect. Preferably, in cases where the neural network unit is not capable of selecting a functional operation mode because the detected conditions, in terms of sensed context and arrangement-status are indicative of more than one functional operation mode, the operation control unit is further configured, in response to the provision of the failed-determination data, to determine an occurrence of a predetermined context such as a movement of an object or subject in the sensing volume using the context-sensing data provided by the context-aware devices, and to select the functional operation mode in dependence on the determined occurrence. For instance, if the neural network unit determined that two modes could be selected based on the presence-sensing signals and the current state of the lighting arrangement, the operation control unit provides the failed-determination data informing the user that no decision has been made. It then provides second user-feedback operation-data to subsequently inform the user about the two candidate functional operation modes and awaits for the determination of an occurrence of a predetermined context that is interpreted as an indication by the user of which of the candidate functional operation modes is the one that the user would like to select.

The user may indicate that one or more of the functional operation modes are "sensitive operation modes", i.e. functional modes that the user considers to involve private practices and should be treated differently by the lighting arrangement, in particular regarding the information stored in the arrangement related to the sensitive operation modes. The user can modify the list of functional operation modes to indicate which ones are considered sensitive by the user. In order to deal with these sensitive operation modes, a particular lighting-arrangement control device comprises an operation control unit that, upon determining that the selected functional operation mode belongs to a pre-specified list of sensitive operation modes, is configured to generate and provide, to one or more lighting units, sensitive-mode-detected data for driving their lighting units in a user-feedback operation informing the user about the selection of a sensitive operation mode as a selected functional operation mode. Here, the user-feedback operation that is activated upon reception of the sensitive-mode-detected data is preferably a predetermined light effect. Optionally, and in response to the provision of the sensitive-mode-detected data, the operation control unit is further configured to determine an occurrence of a predetermined context of an object or subject in the sensing volume using the context-sensing data provided by the context-aware devices and to provide the function-operation data only in response to determining the occurrence of the predetermined context, such as a predetermined movement.

Figure 2:
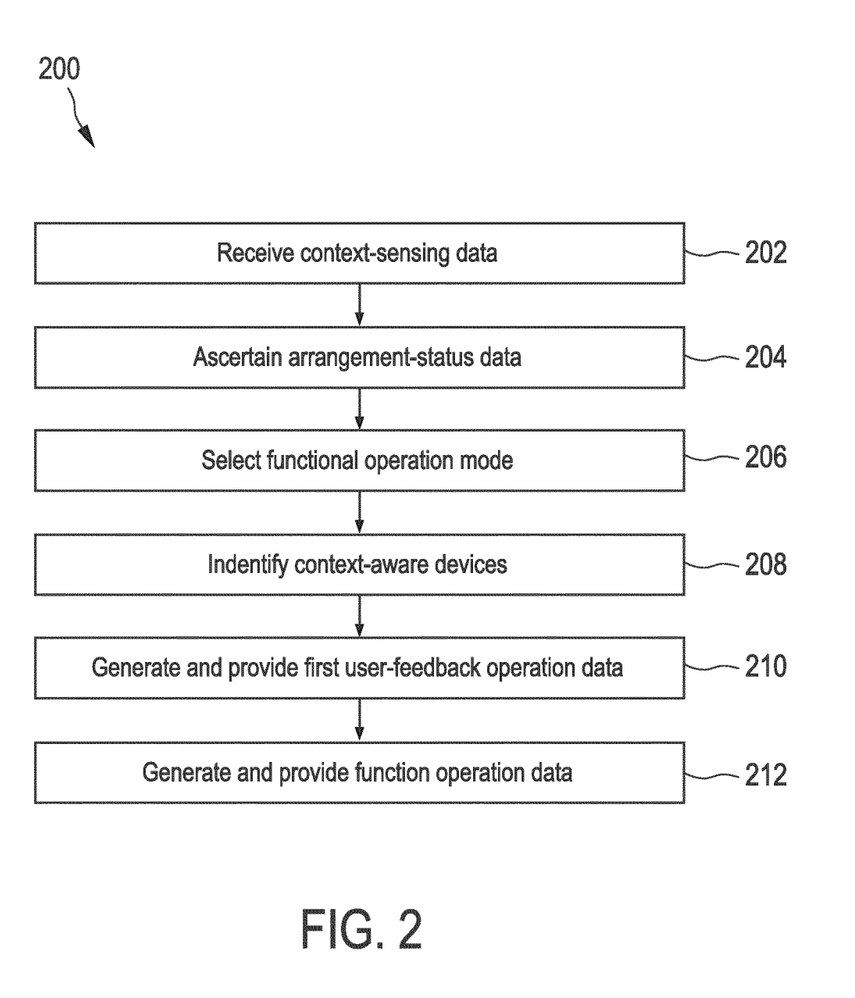
FIG. 2 shows a flow diagram of an embodiment of a method for controlling operation of a lighting-arrangement control device.

FIG. 2 shows a flow diagram of an embodiment of a method 200 for operating a lighting-arrangement control device. The method comprises, in a step 202, receiving, from at least one external lighting device having a lighting unit and a context-sensing unit, respective context-sensing data, determined from a RF-signal transmission between the at least one external lighting device and at least another external lighting device, and that is correlatable to a context of an object or subject within a respective sensing volume. The method comprises, in a step 204, ascertaining arrangement-status data indicative of a state of the lighting arrangement, and in a step 206, selecting, using the respective context-sensing data and the arrangement-status data, one functional operation mode from a plurality of pre-specified functional operation modes of the lighting arrangement, each functional operation mode being associated with operation of one or more respective functional lighting devices. The method also comprises, in a step 208, identifying, in dependence on the selected functional operation mode and the context-sensing data, context-aware devices corresponding to those at least two lighting devices that have performed the RF-signal transmission for determining the context-sensing data that has been relevant for the determination of the functional operation mode. The method also comprises, in a step 210, generating and providing, to the identified context-aware devices, first user-feedback operation-data for driving their lighting units in a user-feedback operation informing a user about the identified context-aware devices, and in a step 212, generating and providing, to the functional lighting devices, function-operation data for operating of their lighting units in accordance with the selected functional operation mode.

Figure 3:
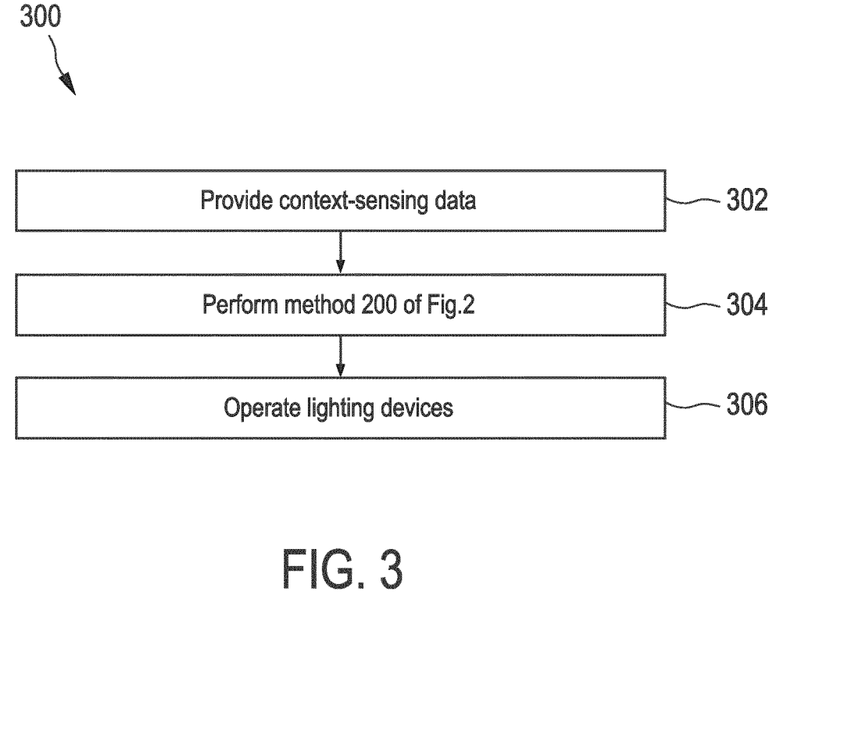
FIG. 3 shows a flow diagram of an embodiment of a method for controlling operation of a lighting-arrangement control device.

FIG. 3 shows an exemplary flow diagram of a method 300 for operating a lighting arrangement having a one or more lighting devices having a respective lighting unit, one of which further comprises a context-sensing unit. The method 300 comprises, in a step 302, providing context-sensing data determined from a RF-signal transmission between the lighting device having the context-sensing unit and at least another lighting device, and that is correlatable to a context of an object or subject within a respective sensing volume. The method also comprises, in a step 304, performing the steps of method 200 of FIG. 2. The method finally comprises, in a step 306, operating the lighting devices in accordance with received function-operation data and the first user-feedback operation-data. Another exemplary method (not shown) also includes operating the lighting devices further in accordance with second user-feedback operation-data, with sensitive-mode-detected data, with failed-determination data.

In summary, the invention is directed to a lighting-arrangement control device for controlling operation of a lighting arrangement, and configured to receive, from at least one lighting device context-sensing data correlatable to a context, such as a presence or a movement of a subject within a respective sensing volume. An operation control unit is configured to ascertain arrangement-status data, to select one functional operation mode from a plurality of pre-specified functional operation modes of the lighting arrangement, each being associated with respective functional lighting devices and to identify as context-aware devices those lighting devices that have provided the context-sensing data relevant for the selection of the functional operation mode. The operation control unit is configured to provide, to the identified context-aware devices, first user-feedback operation-data for driving their lighting units in a user-feedback operation for informing a user about the identified context-aware devices.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A lighting arrangement comprising;
a lighting-arrangement control device; and
a plurality of lighting devices having respective lighting units;
wherein a lighting device of the plurality of lighting devices also comprises a context-sensing unit configured to provide context-sensing data, determined from a RF-signal transmission between the lighting device and at least another lighting device of the plurality of lighting devices, and that is indicative of a presence, a movement, a movement direction, a velocity, a position or an activity of an object or subject within a respective sensing volume;
wherein the lighting-arrangement control device comprises:
an input unit for receiving, from the at least one external lighting device having a lighting unit and a context-sensing unit, respective context-sensing data; and
an operation control unit configured:
to ascertain arrangement-status data indicative of a state of the lighting arrangement;
to select, using the respective context-sensing data and the arrangement-status data, one light scene from a plurality of pre-specified light scenes of the lighting arrangement, each scene being associated with operation of one or more lighting devices of the plurality of lighting devices;
in dependence on the selected light scene and the context-sensing data, to identify context-aware devices corresponding to the at least two lighting devices of the plurality of lighting devices that have provided the RF-signal transmission to the context-sensing unit for determining the context-sensing data that has been relevant for the selection of the light scene;
to generate and provide, to the identified context-aware devices, first user-feedback operation-data for driving the lighting units in a user-feedback operation informing a user about the identified context-aware devices; and
to generate and provide, to the one or more lighting devices of the plurality of lighting devices associated with the selected light scene, function-operation data for operating the lighting units in accordance with the selected light scene;
   wherein the one or more lighting devices are configured to operate in accordance with received function-operation data and the first user-feedback operation-data.

2. The lighting-arrangement of claim 1, wherein the operation control unit is configured to ascertain, using the arrangement status data, data indicative of a position of the lighting devices, or of an operation status of the lighting units, or of an operation status of the context-sensing units or of pre-specified user preferences associated to a respective functional operation mode of the lighting arrangement, or any combination thereof.

3. The lighting-arrangement of claim 1, wherein the first user-feedback operation-data is further configured to drive the lighting units of the context-aware devices in a user-feedback operation further informing the user about a sensed context of the object or subject within the sensing volume.

4. The lighting-arrangement of claim 1, wherein the operation control unit is further configured to generate and provide, to the functional lighting devices, second user-feedback operation-data for driving the respective lighting units of the functional lighting devices in a user-feedback operation informing a user about the functional lighting devices.

5. The lighting-arrangement of claim 4, wherein operation control unit is configured to generate and provide the second user-feedback operation-data for drive the lighting units of the functional lighting devices in a user-feedback operation further informing the user about the selected functional operation mode.

6. The lighting-arrangement of claim 4, wherein the operation control unit is further configured, upon provision of the second user-feedback operation-data, to determine an occurrence of a predetermined context in the sensing volume using the context-sensing data and to provide the function-operation data only in response to determining the occurrence of the predetermined context.

7. The lighting-arrangement of claim 1, wherein the operation control unit comprises a neural network unit, which is configured to receive as input data, the context-sensing data provided by the context-sensing unit and the arrangement status data for detecting changes in operation conditions of the lighting devices of the lighting arrangement that are correlatable to changes of context-sensing data, and to select the functional operation mode in dependence thereon.

8. The lighting-arrangement of claim 7, wherein, when the functional operation mode is not selectable by the neural network unit, the operation control unit is further configured to generate and provide to one or more lighting units failed-determination data for driving said lighting units in a third user-feedback operation informing the user about the inability to select a selected functional operation mode.

9. The lighting-arrangement of claim 8, wherein the operation control unit is further configured, in response to the provision of the failed-determination data, to determine an occurrence of a predetermined context in the sensing volume using the context-sensing data provided by the context-aware devices, and to select the functional operation mode in dependence on the determined occurrence.

10. The lighting-arrangement of claim 1, wherein the operation control unit, upon determining that the selected functional operation mode belongs to a pre-specified list of sensitive operation modes, is configured to generate and provide, to one or more lighting units, sensitive-mode-detected data for driving the lighting units in a user-feedback operation informing the user about the selection of a sensitive operation mode as a selected functional operation mode.

11. The lighting-arrangement of claim 10, wherein the operation control unit is further configured, in response to the provision of the sensitive-mode-detected data, to determine an occurrence of a predetermined context in the sensing volume using the context-sensing data provided by the context-aware devices and to provide the function-operation data only in response to determining the occurrence of the predetermined context.

12. A method for operating a lighting arrangement comprising a plurality of lighting devices having respective lighting units, wherein a lighting device of the plurality of lighting devices also comprises a context-sensing unit, the method comprising:
   providing context-sensing data determined from a RF-signal transmission between the lighting device having the context-sensing unit and at least another lighting device of the plurality of lighting devices, and that is indicative of a presence, a movement, a movement direction, a velocity, a position or an activity of an object or subject within a respective sensing volume;
   receiving, from the lighting device having a lighting unit and a context-sensing unit of the plurality of lighting devices, respective context-sensing data, determined from the RF-signal transmission; and
   ascertaining arrangement-status data indicative of a state of the lighting arrangement;
   selecting, using the respective context-sensing data and the arrangement-status data, one light scene from a plurality of pre-specified light scenes of the lighting arrangement, each light scene being associated with operation of one or more respective lighting devices of the plurality of lighting devices;
   identifying, in dependence on the selected functional operation mode and the context-sensing data, context-aware devices corresponding to the at least two lighting devices that have provided the RF-signal transmission to the context-sensing unit for determining the context-sensing data that has been relevant for the selection of the light scene;
   generating and providing, to the identified context-aware devices, first user-feedback operation-data for driving the lighting units in a user-feedback operation informing a user about the identified context-aware devices;
   generating and providing, to the one or more lighting devices of the plurality of lighting devices associated with the selected light scene, function-operation data for operating of the lighting units in accordance with the selected light scene; and
   operating the one or more lighting devices in accordance with received function-operation data and the first user-feedback operation-data.

13. A non-transitory computer-readable medium containing programming instructions which, when executed by a lighting control arrangement, cause the lighting arrangement to carry out the method of claim 12.

* * * * *